(12) United States Patent
Lee, Jr. et al.

(10) Patent No.: US 6,276,213 B1
(45) Date of Patent: Aug. 21, 2001

(54) SIGNAL CONDITIONER FOR A VIBRATION SENSOR

(75) Inventors: Lloyd Dewey Lee, Jr.; Kent Michael Petersen, both of Knoxville; Cullen Thomas Humphrey, Jr., Oak Ridge, all of TN (US)

(73) Assignee: MAARS, Incorporated, Knoxville, TN (US)

( * ) Notice: Subject to any disclaimer, the term of this patent is extended or adjusted under 35 U.S.C. 154(b) by 0 days.

(21) Appl. No.: 09/471,786

(22) Filed: Dec. 23, 1999

(51) Int. Cl.[7] ................................................... G01H 1/00
(52) U.S. Cl. .............................. 73/660; 702/189
(58) Field of Search ............................ 73/570, 593, 659, 73/660, 649, 602; 702/35, 36, 39, 43, 189, 190

(56) References Cited

U.S. PATENT DOCUMENTS

| | | | |
|---|---|---|---|
| 4,885,707 | * | 12/1989 | Nichol et al. ........................ 73/660 |
| 5,390,545 | * | 2/1995 | Dean ...................................... 73/660 |
| 5,792,956 | * | 8/1998 | Li .......................................... 73/660 |
| 6,078,874 | * | 6/2000 | Piety et al. ........................... 73/660 |

\* cited by examiner

Primary Examiner—Helen Kwok
(74) Attorney, Agent, or Firm—Michael E. McKee

(57) ABSTRACT

A device for conditioning the electrical signal generated by a vibration sensor for use of the conditioned signal by a computer-based data acquisition system utilizes a support body and circuitry for performing a series of operations upon the sensor-generated signal. The circuitry includes an input stage for receiving and amplifying the electrical signal generated by the vibration sensor to thereby develop an output electrical signal of the input, and further includes a gain stage for receiving and AC coupling the output electrical signal of the input stage and amplifying the output signal of the input stage by a predetermined factor and thereby developing an output electrical signal of the gain stage. A integrator receives and integrates the output electrical signal developed by the gain stage, and a filter receives and filters either the output electrical signal developed by the gain stage or the output electrical signal developed by the integrator to thereby develop an output electrical signal by the filter which is free of signal frequency above a preselected frequency range. A buffer receives and amplifies the output electrical signal of the input to thereby develop an output electrical signal of the device. The device further includes a sample/hold stage at which the output signal from the buffer can be collected and frozen as a sample signal for use of the frozen signal by the data-gathering system.

18 Claims, 2 Drawing Sheets

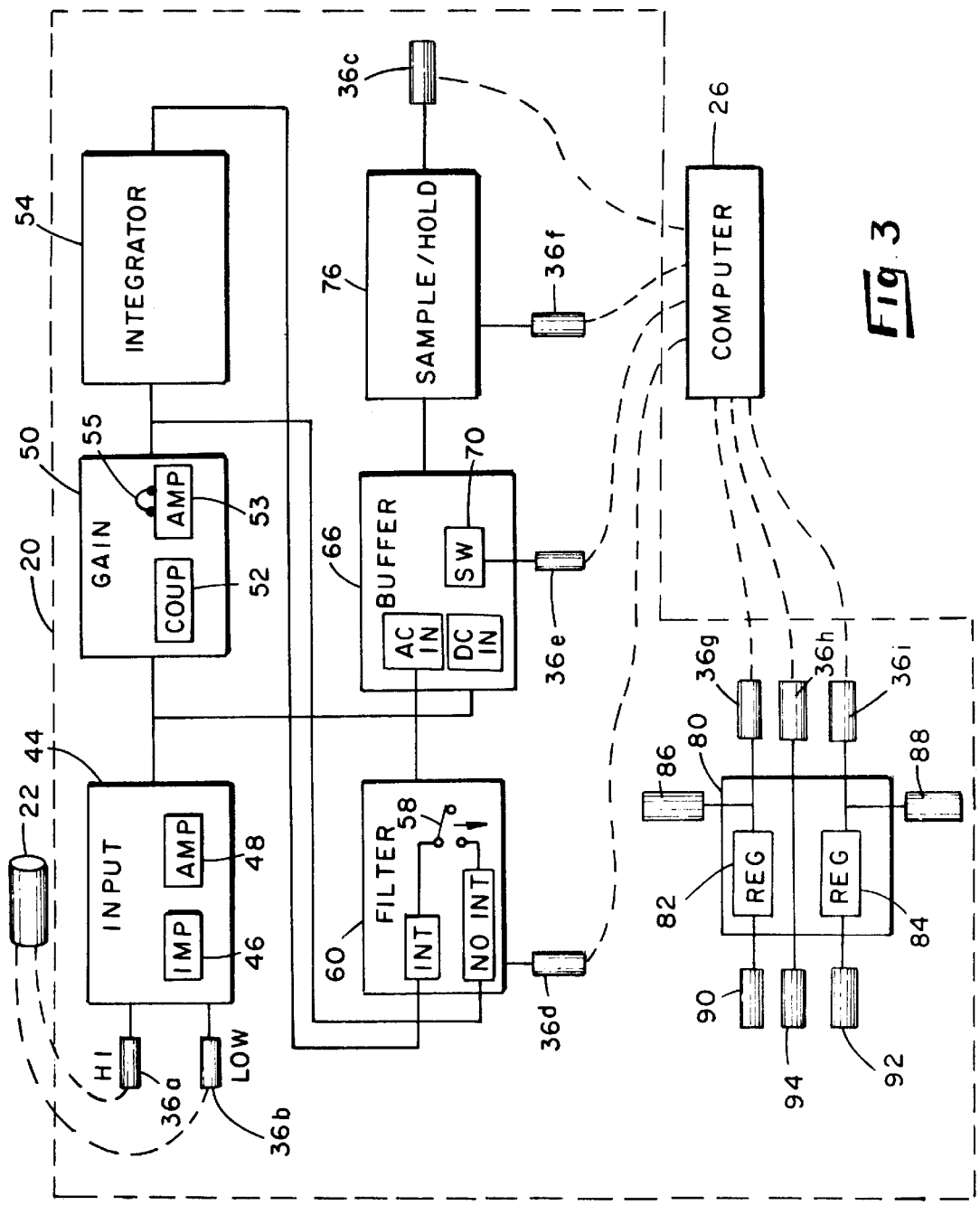

SIGNAL CONDITIONER FOR A VIBRATION SENSOR

BACKGROUND OF THE INVENTION

This invention relates generally to devices which interface between a signal-producing sensor and a computer and relates, more particularly, to means and methods for conditioning a signal generated by a signal-producing sensor for use by a computer-based data acquisition system.

The class of sensors with which this invention is concerned includes those which are used for monitoring vibration. In particular, such sensors (referred to herein as vibration sensors) include displacement probes, velometers and accelerometers, and examples of vibrations which are capable of being monitored with such sensors include those attending a rotating shaft. Displacement probes, for example, can be positioned in close proximity to the surface of a rotating shaft for monitoring the lateral displacement of the shaft during its revolutions, and a velometer or an accelerometer can be positioned against the surface of a component within which a rotating shaft is housed for monitoring the vibration speed (i.e. the change in displacement as a function of time) or the vibration acceleration (i.e. the change in velocity as a function of time) during shaft rotation. An operator who is gathering information relating to the vibrations to be monitored could select either a displacement probe, a velometer or a accelerometer for use in his data-gathering application.

Heretofore, there has not existed a single device which is capable of conditioning a signal from a displacement probe, a velometer and an accelerometer for use of that conditioned signal by a computer-based data acquisition system.

Accordingly, it is an object of the present invention to provide a signal-conditioning device which is capable of use with any of the aforementioned vibration sensors.

Another object of the present invention to provide such a device whose components are packaged in a single, compact unit facilitating the collection of a conditioned vibration signal by the data acquisition system.

Still another object of the present invention to provide such a device whose features render any of a number of characteristics of the vibration signal to be collected from the device for use by the data acquisition system.

Yet another object of the present invention is to provide such a device which is uncomplicated in construction yet effective in operation.

SUMMARY OF THE INVENTION

This invention resides in a device for conditioning the electrical signal generated by a vibration sensor for use of the conditioned signal by a computer-based data acquisition system.

The device includes a support body and input means mounted upon the support body including an impedance for receiving the electrical signal generated by a vibration sensor and across which the received signal is sensed. The input means further includes an amplifier for amplifying the electrical signal sensed across the impedance to thereby develop an output electrical signal of the input means. Gain means are mounted upon the support body for receiving and AC coupling the output electrical signal of the input means and amplifying the output signal of the input means by a predetermined factor and thereby developing an output electrical signal of the gain means; and integrating means are mounted upon the support body for receiving and integrating the output electrical signal developed by the gain means and thereby developing an output electrical signal of the integrating means. The device also includes filter means mounted upon the support body for receiving and filtering one of the output electrical signal developed by the gain means and the output electrical signal developed by the integrating means to thereby develop an output electrical signal by the filter means which is free of signal frequency above a preselected range, and the filter means has an adjustable setting enabling the preselected frequency range of the filter to be altered. A conductor is associated with the filter means through which frequency-setting commands are received by the filter means, and buffer means are mounted on the support body for receiving and amplifying the output electrical signal of the filter means to thereby develop an output electrical signal of the buffer means. An output conductor is associated with the buffer means enabling the output electrical signal developed by the buffer means to be conducted to a computer-based data acquisition system. In addition, a sample/hold means is mounted upon the support body for receiving and freezing the output signal from the buffer means as a sample signal, and a conductor is associated with the sample/hold means through which operation of the sample/hold means is initiated.

BRIEF DESCRIPTION OF THE DRAWINGS

FIG. 3 is a schematic view illustrating in block diagram form the operation of the FIG. 2 embodiment.

DETAILED DESCRIPTION OF AN ILLUSTRATED EMBODIMENTS

Figure 1:
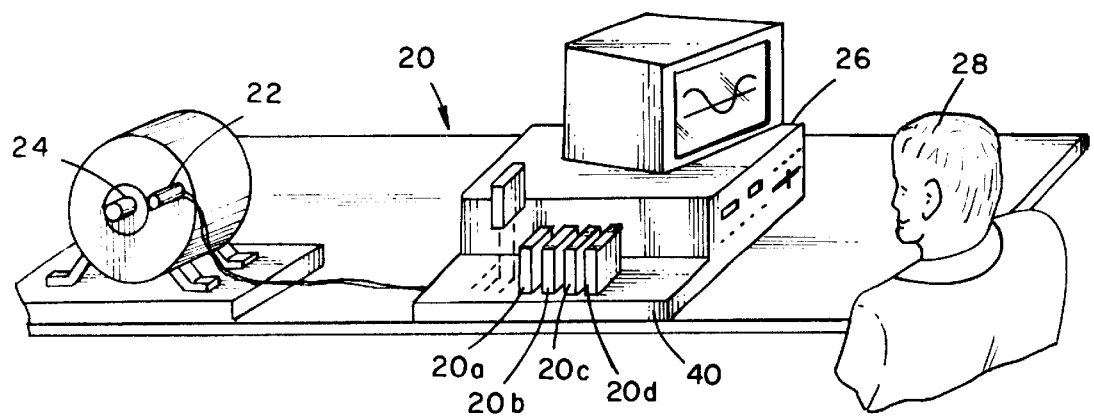
FIG. 1 is a perspective view of an embodiment of the invention shown being utilized to condition a signal from a vibration sensor for use of the conditioned signal by a computer-based data acquisition system.

Turning now to the drawings in greater detail, there is illustrated in FIG. 1 a perspective view of an embodiment, generally indicated 20, of a device within which features of the present invention are embodied and an exemplary environment within which the device 20 is used. In particular, the FIG. 1 environment includes a vibration sensor 22 positioned in relatively close proximity to the surface of a rotating shaft 24 for generating signals in response to vibrations of the shaft 24 and a computer-based data acquisition system 26 to which the signals generated by the sensor 22 are ultimately received for use by an operator 28 in a shaft-monitoring operation. By monitoring the vibration characteristics of, for example, a rotating shaft or component surfaces beneath which a rotating shaft is housed, an operator 28 may be forewarned of potential problems which may necessitate the need for shaft replacement or repair. As will be apparent herein, the device 20 provides an interface between the vibration sensor 24 and the computer-based data acquisition system 26 for conditioning the signal generated by the vibration sensor 24 for use by the system 26. The conditioned signal can, for example, be used by the system 26 to generate plots depicting a change in vibration as a function of time or provide other monitoring information which may be desired by the operator for analyzing the vibrations.

Vibration sensors are typically categorized as either displacement probes, velometers or accelerometers for gathering, respectively, displacement, velocity and acceleration information. Depending upon the information desired by an operator for a vibration-monitoring application, an operator 28 would select a sensor from the foregoing three categories for use. Of course, since the displacement is a first derivative of velocity, and the velocity is the first derivative of acceleration, a signal from one of these three sensor categories can be converted, by appropriate treatment or conditioning, to a signal corresponding to the signal generated by a sensor of one of the other two categories of sensors. In this regard and as will be apparent herein, the device 20 includes means for integrating, if desired, the sensor-generated signal as it is conducted through the circuits of the device 20.

The signal generated by the vibration sensor 24 is an electrical signal which commonly is comprised of a DC component, as well as an AC component, indicative of the vibrations being measured. For vibration analysis purposes, the DC component of the signal (or, more particularly, the magnitude of the DC component) may be of some interest. Consequently and as will be apparent herein, the device 20 provides a means by which the DC component can be transmitted directly to the data acquisition system for use. By comparison, the AC component of the sensor signal is acted upon in several conditioning stages of the device 20 before the AC component of the signal is transmitted to the data acquisition system 26.

Figure 2:
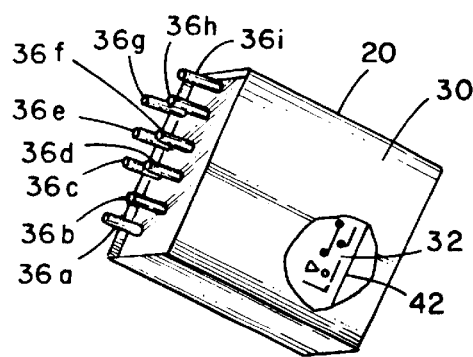
FIG. 2 is a perspective view of the FIG. 1 embodiment of the device.

With reference to FIG. 2, the device 20 includes an outer casing 30, internal solid state circuitry 32 mounted within the casing 30, an amount 34 of potting resin which has been poured within the casing 30 and permitted to harden about the circuitry 32, and a plurality of conductive pins 36a–36i (described herein) appropriately joined to the circuitry 32 and protruding from one end of the casing 30 for permitting signals to be received and sent from the circuitry 32 in the manner addressed herein. The pins 36a–36i enable the device 20 to be plugged into a mounting board 40 (FIG. 1) which is appropriately wired between the vibration sensor 22 and the data acquisition system 26 for receiving signals from the vibration sensor 22 before the conditioned signal is transmitted to the data acquisition system 26 for use. As will be apparent herein, the device 20 is adapted to act upon, or condition, a signal from a single vibration sensor 22 so that if several vibration signals are desired to be monitored with the system 26, several devices (such as the devices 20a–20d shown in FIG. 1) which are identical in structure to the device 20 are necessary. Accordingly, the depicted mounting board 40 is adapted to accept the conductor pins of a plurality of devices 20 and 20a–20d plugged into and arranged in a row along the length of the board 40, and vibration information can be gathered from each device 20 by the data acquisition system 26 through separate channels.

With reference again to FIG. 2, there is associated with the circuitry 32 a support body in the form of a circuit board 42 upon which the various solid state components of the circuitry 32 are mounted.

The components and operation of the solid state circuitry 32 of the device 20 can be best understood with reference to the block diagram of FIG. 3. The principle components of the circuitry 32 include an input stage including input means, generally indicated 44, mounted upon the circuit board 42 for receiving the electrical signal from the vibration sensor 22 (by way of a pair of pins 36a and 36b—one of which is the high-side pin and the other of which is the low-side pin) and including an impedance 46 through which the sensor-generated signal is conducted so that an impeded signal is sensed thereacross and an amplifier 48 to amplify the signal sensed across the impedance 46. By amplifying the signal at this input stage, the magnitude of the sensor-generated signal is increased so that the sensitivity of information gleaned from the sensor-generated signal is also increased. It follows that the input means 44, by way of its impedance function and amplification of the sensor-generated signal, develops an output electrical signal which, as will be apparent herein, is acted upon by subsequent stages of the circuitry 32.

As mentioned earlier, a signal generated from a vibration sensor is typically comprised of a DC component, as well as an AC component. For some data-gathering operations, the characteristics of the DC component of the sensor-generated signal may be of some interest to an operator, and there is no need for the DC component of the signal to be acted upon by stages of the circuitry 32 beyond the input stage. Accordingly and to facilitate the collection of the output electrical signal of the input means 44 by the data-collection system 26 (for collecting information relating to, for example, the DC component of the sensor-generated signal), an output conductor pin 36c is provided for the device 20 through which the output signal of the input means 44 can be conducted directly to the data-collection system 26 for use thereby.

The circuitry 32 also includes a gain stage including gain means, generally indicated 50, mounted upon the circuit board 42 for receiving and AC coupling the output electrical signal of the input means 44. To this end, the gain means 50 includes an AC coupler 52 which is adapted to remove the DC component from the output signal of the input means 44 so that only the AC component remains in the signal as the signal is passed through the gain means 50, and this AC component is all that is acted upon in subsequent stages of the circuitry 32.

In addition, the gain means 50 includes an amplifier 53 for amplifying the AC component of output electrical signal of the input means 44 by a predetermined factor and thereby developing an output electrical signal of the gain means 50. In the depicted device 20, the gain means 50 can be internally wired to provide a gain of either 1.6 or 3.2 (by known means) so that the output from the input stage 44 is multiplied by a factor of 1.6 or 3.2. In other words, the circuitry of the gain means 50 includes means for multiplying the output signal from the input stage by each factor 1.6 and 3.2, even though only one of these factors is selected for use with any one device 20.

As far as the magnitude of the gain factors (1.6 or 3.2) is concerned, one of these gain factors is normally capable of swinging the output signal (of the gain means 50) through about ±5 volts and aids in the resolution capabilities of the signal. The gain factor is set at the time of manufacture of the device 20 by installation of a jumper wire 55 from one junction to one of two possible junctions in the circuit of the gain means 50. It follows that by virtue of the AC coupling and amplifying functions of the gain means 50, an output electrical signal is developed by the gain means 50.

The device 20 also includes integrating means 54 mounted upon the circuit board 42 for receiving and integrating (if desired) the output electrical signal developed by the gain means 50 and thereby developing an output electrical signal of the integrating means 54. Basically, the integrating means 54 provides analog integration of the received signal over a time constant and may be desired to convert, for example, the signal generated by an accelerometer-class of vibration sensor to a signal corresponding to a velometer-class of sensor or the signal generated by a velometer-class of vibration sensor to a signal corresponding to a displacement probe-class of sensor. Whether or not the integrating means 54 operates upon the output electrical signal developed by the gain means 50 is determined at time of manufacture with a jumper wire 58 (described herein) used to route the output signal of the gain means 50 either through the integrating means 54 and then through a filter (described herein) or directly through the filter. In any event, the operation of the integrating means 54 upon the output of the gain means 50 develops an output signal of the integrating means 54.

The next stage of the device 20 is a filter stage including a filter means 60 mounted upon the circuit board 42 for receiving and filtering either the output electrical signal developed by the gain means 50 or the output electrical signal developed by the integrating means 54 to thereby develop an output electrical signal by the filter means 60. Depending upon the vibration analysis undertaken, an operator may desire that the output signal of the gain means 50 not be integrated before being conducted through the filter means 60; and in such an instance, the integrating means 54 is bypassed with the aforementioned jumper wire 58 which conducts the (un-integrated) output signal from the gain means 50 directly to the filter means 60. If, on the other hand, the output signal of the gain means 50 is desired to be integrated prior to its conductance to the filter means 60, the jumper wire 58 is connected between the output of the gain means 50 and the input of the filter means 60. This jumper wire 58 is installed at time of manufacture to render the device 20 either an integrating device or a non-integrating device. In either event, however, the integrating means 54 is included as part of the device circuitry 32, whether it is utilized or not to act upon the sensor-generated signal.

With reference again to the filter means 60, the filter means 60 utilizes an 8th order, low pass, elliptic, switched-capacitor for anti-alias filtering of the AC coupled signal received from the gain means 50 or from the integrating means 54. This anti-alias filtering is necessary because the AC coupled signal from a vibration sensor is analyzed (by the data acquisition system 26) in the frequency domain, and without such filtering, the frequency of the signal could be misinterpreted in the data acquisition system 26.

The low pass break frequency of the filter means 60 is set by a clock signal applied to the filter means 60 from the data acquisition system 26. In other words, the filter means 60 can be set to filter from the signal routed therethrough those parts of the signal which are in excess of a predetermined setting of the filter means 60. For example, if the filter means 60 is set at 1000 Hz, then none of the signal which is in excess of 1000 Hz is permitted to pass through the filter means 60. To accommodate the conductance of the clock signal to the filter means 60, there is provided in the device 20 a conducting pin 36d which is joined to the filter means 60 and through which the clock signal is conducted to the filter means 60 from the system 26.

The device is also provided with a buffer stage including buffer means 66 for interfacing between the output of the device 20 and the input of the data acquisition system 26 following an amplification of the output signal received from the filter means 60. To this end, the buffer means 66 includes an amplifier 68 which amplifies the signal received from the filter means 60 to increase the resolution-capacity of the signal. Furthermore, the buffer means 66 includes a switch 70 which permits selection between either the AC coupled signal received from the filter means 60 or the DC coupled signal received from the input means 44. In other words, depending upon the selection of the setting at the switch 70, the signal which is permitted to be conducted through the switch 70 by the output conducting pin 36c is either the AC coupled signal received from the filter means 60 or the DC coupled signal received from the input means 44.

Joined to the switch 70 of the buffer means 66 is a control (or conducting) pin 36e whose state can be altered by the data acquisition system 26 for controlling the setting of the switch 70. In the depicted device 20, when the state of the control pin 36e is low (or ground, i.e. zero volts), the switch 70 permits the DC signal to be conducted to the output of the device 20, and when the state of the control pin 36e is high (e.g. ±5 volts), the switch 70 permits the AC signal to be conducted to the output of the device 20. In either instance, the output of the buffer means 66 (whether a DC signal or an AC signal) is conducted to the output conducting pin 36c which enables the output signal of the buffer means 66 to be conducted to the data acquisition system 26.

A final stage of the device 20 is a sample/hold stage including a sample/hold means 76 interposed between the buffer means 66 and the output conducting pin 36c for collecting and freezing, when desired, a sample output signal from the buffer means 66 at a single instant in time so that the output signal sensed at the output pin 36c is the frozen output (sample) signal. If, for example, several identical devices (e.g. the devices 20 and 20a–20d of FIG. 1) are used to simultaneously monitor the signals received from several vibration sensors, it may be desirable to freeze (and thereby sample) the output signals from the buffer means 66 of each device 20 at a given, or selected, instant in time. This way, the sensor-generated signals generated by each of the several vibration sensors at a single moment in time can be subsequently collected for analysis.

The device 20 also includes a control, or conductor, pin 36f is connected to the circuitry 32 of the sample/hold means 76 enabling the data-gathering system 26 to send operating command signals to the sample/hold means 76. In the designated device 20, when the state of the control pin 36f is maintained low (ground, or zero volts), the sample/hold means 76 is operative in that the output of the buffer means 66 at a single instant in time is frozen by the sample/hold means 76 and that collected signal is withdrawn through the output conductor pin 36c by the data acquisition system 26 for collection and subsequent analysis. By comparison, when the state of the control pin 36c is held high (e.g. ±5 volts), the sample/hold means 76 remains inoperative in that the output signal capable of being tracked at the output conductor pin 36c is the output signal of the buffer means 66.

Within the depicted device 20, each of the amplifier 48 of the input means 44, the amplifier 53 of the gain means 50, the integrating means 54, the buffer means 66 and the sample/hold means 76 operates between +12 volts and −12 volts, while the filter means 60 operates between +5 volts and −5 volts. For conducting the necessary operating power to the device 20, the device 20 includes a power-receiving circuit 80 (FIG. 3) having three conducting pins 36g, 36h and 36i adapted to be plugged into the corresponding receptacles of the mounting board 40 for conducting electrical power from a +12 volt electrical supply, the ground (i.e. 0 volt source), and a −12 volt electrical supply, respectively, appropriately connected to the mounting board 40. Incorporated within the circuit 80 are voltage regulators 82 and 84 for operating upon the +12 volts and −12 volts, respectively, conducted thereto so that the output of the regulators 82 and 84 is limited to +5 volts and −5 volts, respectively. Therefore, the +12 volts and −12 volts of power needed for operation of each of the input means 44, the gain means 50, the integrating means 54, the buffer means 66 and the sample/hold means 76 is conducted to the components 44, 50, 54, 66 and 76 from the power-receiving circuit 80 by way of circuit terminals 86 and 88 which, in turn, are directly connected to the conducting pins 36g and 36i, and the +5 volts and −5 volts of power needed for operation of the filter means 60 is conducted to the filter means 60 from the power-receiving circuit 80 (by way of the terminals 90 and 92) at the output of the regulators 82 and 84. In addition, a ground terminal 94 is provided within the circuit 80 through which each circuit component 44, 50, 54, 60, 66 and 76 is grounded.

It follows that a device 20 has been shown and described which conditions an input signal received from a vibration sensor by amplifying, AC coupling, integrating, filtering, and subsequently amplifying the signal before the signal is collected at an output pin 36c by a data acquisition system 26 for use in analysis purposes. To reduce the need for inventory of, for example, a supply of integrating devices versus non-integrating devices or devices whose gain factor (in the gain stage) is 1.6 versus 3.2, a purchaser may be expected to select the magnitude of the amplification performed in the gain stage (i.e. either 1.6 or 3.2) and to indicate (to the manufacturer) whether the device is expected to perform an integration step in the integration stage. With this information in hand, the manufacturer will appropriately connect the jumper wires 55 and 58 between the appropriate junctions in the gain stage and the filter stage to satisfy the customer's specifications. Following connection of the jumper wires 55 and 58 between the appropriate junctions and installation of the circuit board 42 and pins 36a–36i into the casing 30, an appropriate potting compound (comprised, for example, of a non-conducting epoxy resin) is poured into the casing 30 so that the pins 36a–36i extend from one end (i.e. the open end) of the casing 30, and the potting compound is permitted to harden. With the pins 36a–36i protruding from the casing 30, the device 20 is capable of being plugged into the mounting board 40 of the data acquisition system 26. It follows that since pins 36a–36i of the device 20 must be matched with appropriate openings provided in the mounting board 40 for passing signals between the device 20 and the data acquisition system 26, the pins 36a–36i must be positioned in the appropriate locations with respect to one another so that each pin 36a–36i of the device 20 aligns with the appropriate opening provided in the mounting board 40.

It will be understood that numerous modifications and substitutions can be had to the aforedescribed embodiment 20 without departing from the spirit of the invention. Accordingly, the aforedescribed embodiment is intended for the purpose of illustration and not as limitation.

What is claimed is:

1. A device for conditioning the electrical signal generated by a vibration sensor for use of the conditioned signal by a computer-based data acquisition system, the device comprising:

a support body;

input means mounted upon the support body including an impedance for receiving the electrical signal generated by the vibration sensor and across which the received signal is sensed, and the input means further including an amplifier for amplifying the electrical signal sensed across the impedance to thereby develop an output electrical signal of the input means;

gain means mounted upon the support body for receiving and AC coupling the output electrical signal of the input means and amplifying the output signal of the input means by a predetermined factor and thereby developing an output electrical signal of the gain means;

integrating means mounted upon the support body for receiving and integrating the output electrical signal developed by the gain means and thereby developing an output electrical signal of the integrating means;

filter means mounted upon the support body for receiving and filtering one of the output electrical signal developed by the gain means and the output electrical signal developed by the integrating means to thereby develop an output electrical signal by the filter means which is free of signal frequency above a preselected range, and the filter means having an adjustable setting enabling the preselected frequency range of the filter to be altered;

a conductor associated with the filter means through which frequency-setting commands are received by the filter means;

buffer means mounted on the support body for receiving and amplifying the output electrical signal of the filter means to thereby develop an output electrical signal of the buffer means;

an output conductor associated with the buffer means for enabling the output electrical signal developed by the buffer means to be conducted to a computer-based data acquisition system;

sample/hold means for receiving and freezing the output signal from the buffer means as a sample signal; and a conductor associated with the sample/hold means through which operation of the sample/hold means is initiated.

2. The device as defined in claim 1 further comprising means for, connected between the input means and the buffer means, enabling the output electrical signal developed by the input means to be conducted directly to the buffer means without being acted upon by the gain means, integrating means or filtering means;

the buffer means includes a switch for selectively permitting either the output electrical signal developed by the filter means or the output electrical signal developed by the input means to be conducted to the output conductor associated with the buffer means; and an additional conductor is associated with the buffer means through which a switch-setting command signal is received by the switch of the buffer means.

3. The device as defined in claim 2 wherein a setting of the switch of the buffer means is determined by a low or a high voltage state of the additional conductor associated with the buffer means.

4. The device as defined in claim 1 wherein the predetermined factor of the gain means is either 1.6 or 3.2.

5. The device as defined in claim 1 further including means for, connected between the gain means and the filter means, enabling the output electric signal developed by the gain means to be conducted directly to the filter means without being acted upon by the integrating means.

6. The device as defined in claim 1 wherein the operation of the sample/hold means is initiated by one of a low or a high voltage state of the conductor associated with the sample/hold means.

7. The device as defined in claim 1 further including a pair of conductors associated with the input means through which the electrical signal generated by a the vibration sensor is received by the input means.

8. The device as defined in claim 1 wherein the support body upon which the input means, gain means, integrating means, filter means, buffer means and sample/hold means are mounted is a circuit board and the device further includes an open-ended outer casing within which the circuit board is positioned.

9. A device for connection between a vibration sensor and a computer-based data acquisition system for conditioning the an electrical signal generated by a vibration sensor for use of the conditioned signal by the computer-based data acquisition system, the device comprising:

a support body;

input means mounted upon the support body including an impedance for receiving the electrical signal generated by a the vibration sensor and across which the received signal is sensed, and the input means further including an amplifier for amplifying the electrical signal sensed across the impedance to thereby develop an output electrical signal of the input means;

a pair of conductor pins associated with the input means through which the electrical signal generated by a the vibration sensor is received by the input means;

gain means mounted upon the support body for receiving and AC coupling the output electrical signal of the input means and then amplifying the output signal of the input means to thereby develop an output electrical signal of the gain means;

integrating means mounted upon the support body for receiving and integrating the output electrical signal developed by the gain means and thereby developing an output electrical signal of the integrating means;

filter means mounted upon the support body for receiving and filtering one of the output electrical signal developed by the gain means and the output electrical signal developed by the integrating means to thereby develop an output electrical signal by the filter means which is free of signal frequency above a preselected range, and the filter means having an adjustable setting enabling the preselected filter frequency range to be altered;

a conductor pin associated with the filter means and connectable to the computer-based data acquisition system through which frequency-setting commands are received by the filter means from the data acquisition system;

buffer means mounted upon the support body for receiving and amplifying the output electrical signal from the filter means to thereby develop an output electrical signal of the buffer means;

an output conductor pin associated With the buffer means enabling the output electrical signal to be conducted to a the computer-based data acquisition system;

means connected between the input means and the buffer means for enabling the output electrical signal developed by the input means to be conducted directly to the buffer means without being acted upon by the gain means, integrating means or filtering means;

the buffer means includes a switch for selectively permitting either the output electrical signal developed by the filter means or the output electrical signal developed by the input means to be conducted to the output conductor pin associated with the buffer means;

an additional conductor pin associated with the buffer means and connectable to the computer-based data acquisition system through which a switch-setting command signal is received by the switch of the buffer means from the data acquisition system;

sample/hold means for receiving and freezing the output electrical signal of the buffer means at a selected instant of time so that the output signal conducted to the computer-based data acquisition system by way of the output conductor pin during operation of the sample/hold means is the signal which has been frozen by the sample/hold means; and a conductor pin associated with the sample/hold means and connectable to the computer-based data acquisition system through which the operation of the sample/hold means is initiated by the computer-based data acquisition system.

10. The device as defined in claim 9 wherein a setting of the switch of the buffer means is determined by a low or a high voltage state of the conductor pin associated with the buffer means, and wherein the high or low voltage state of the conductor pin associated with the buffer means is determined by the data acquisition system.

11. The device as defined in claim 9 wherein the gain means is adapted to amplify the output signal of the input means by a predetermined factor and the predetermined factor of the gain means is either 1.6 or 3.2.

12. The device as defined in claim 9 further including means for, connected between the gain means and the filter means, enabling the output electric signal developed by the gain means to be conducted directly to the filter means without being acted upon by the integrating means.

13. The device as defined in claim 9 wherein the operation of the sample/hold means is initiated by one of a low or a high voltage state of the conductor pin associated with the sample/hold means, and wherein the high or low voltage state of the conductor pin associated with the sample/hold means is determined by the data acquisition system.

14. The device as defined in claim 9 wherein the support body upon which the input means, gain means, integrating means, filter means, buffer means and sample/hold means are mounted is a circuit board and the device further includes an open-ended outer casing within which the circuit board is positioned and an amount of potting resin positioned within the outer casing so that the circuit board is embedded within the resin and the conducting pins extend out of the resin at the open end of the casing.

15. In combination with a signal-generating vibration sensor and a computer-based data acquisition system for analyzing signals of the vibration sensor, a device for conditioning an electrical signal generated by the vibration sensor for use of the conditioned signal by the computer-based data acquisition system, the device including:

a support body;

input means mounted upon the support body including an impedance for receiving the electrical signal generated by the vibration sensor and across which the received signal is sensed, and the input means further including an amplifier for amplifying the electrical signal sensed across the impedance to thereby develop an output electrical signal of the input means;

gain means mounted upon the support body for receiving and AC coupling the output electrical signal of the input means and amplifying the output signal of the input means by a predetermined factor and thereby developing an output electrical signal of the gain means;

integrating means mounted upon the support body for receiving and integrating the output electrical signal developed by the gain means and thereby developing an output electrical signal of the integrating means;

filter means mounted upon the support body for receiving and filtering one of the output electrical signal developed by the gain means and the output electrical signal developed by the integrating means to thereby develop an output electrical signal by the filter means which is free of signal frequency above a preselected range, and the filter means having an adjustable setting enabling the preselected frequency range of the filter to be altered;

a conductor associated with the filter means through which frequency-setting commands are received by the filter means;

buffer means mounted on the support body for receiving and amplifying the output electrical signal of the filter means to thereby develop an output electrical signal of the buffer means;

an output conductor associated with the buffer means for enabling the output electrical signal developed by the buffer means to be conducted to the computer-based data acquisition system;

sample/hold means for receiving and freezing the output signal from the buffer means as a sample signal; and a conductor associated with the sample/hold means through which operation of the sample/hold means is initiated.

16. The combination as defined in claim 15 wherein the device further includes means for, connected between the input means and the buffer means, enabling the output electrical signal developed by the input means to be conducted directly to the buffer means without being acted upon by the gain means, integrating means or filtering means;

the buffer means includes a switch for selectively permitting either the output electrical signal developed by the filter means or the output electrical signal developed by the input means to be conducted to the output conductor associated with the buffer means; and an additional conductor is associated with the buffer means through which a switch-setting command signal is received by the switch of the buffer means.

17. The device as defined in claim 16 further including means for, connected between the gain means and the filter means, enabling the output electric signal developed by the gain means to be conducted directly to the filter means without being acted upon by the integrating means.

18. The device as defined in claim 15 wherein the operation of the sample/hold means is initiated by one of a low or a high voltage state of the conductor associated with the sample/hold means.

* * * * *